(12) United States Patent
Jain et al.

(10) Patent No.: US 11,283,787 B2
(45) Date of Patent: Mar. 22, 2022

(54) COMPUTER RESOURCE PROVISIONING

(71) Applicant: INTERNATIONAL BUSINESS MACHINES CORPORATION, Armonk, NY (US)

(72) Inventors: Astha Jain, Durham, NC (US); Zack Traube Grossbart, Somverville, MA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/846,937

(22) Filed: Apr. 13, 2020

(65) Prior Publication Data

US 2021/0320908 A1 Oct. 14, 2021

(51) Int. Cl.
*H04L 9/40* (2022.01)
*H04L 29/06* (2006.01)

(52) U.S. Cl.
CPC ................... *H04L 63/08* (2013.01)

(58) Field of Classification Search
CPC ....... H04L 63/08; H04L 63/083; H04L 41/06; H04L 67/12
See application file for complete search history.

(56) References Cited

U.S. PATENT DOCUMENTS

| | | | |
|---|---|---|---|
| 8,255,984 B1 * | 8/2012 | Ghostine | ................. G06F 21/62 726/8 |
| 9,244,958 B1 | 1/2016 | Maccanti | |
| 9,405,588 B2 | 8/2016 | Stolyar | |
| 9,792,426 B1 * | 10/2017 | Driscoll | ................... G06F 21/62 |
| 9,813,303 B1 * | 11/2017 | Guigli | ................. H04L 63/0807 |
| 2003/0212660 A1 * | 11/2003 | Kerwin | ................. G06F 16/252 |
| 2007/0233957 A1 * | 10/2007 | Lev-Ran | ............. G06F 12/1458 711/118 |
| 2008/0010480 A1 * | 1/2008 | Hurley | ................... H04L 67/26 714/1 |
| 2008/0052512 A1 * | 2/2008 | Stevens | ............... H04L 63/1441 713/168 |

(Continued)

FOREIGN PATENT DOCUMENTS

| | | |
|---|---|---|
| CN | 107025135 A | 8/2017 |
| WO | 2017200752 A1 | 11/2017 |

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Aravind K Moorthy
(74) *Attorney, Agent, or Firm* — Schmeiser, Olsen & Watts; Christopher M. Pignato

(57) ABSTRACT

A method, system, and computer program product for implementing computer resource provisioning is provided. The method includes receiving a first request for identification credentials associated with a user. In response, resource identification credentials for the user are generated and a second request for generating a first computer resource is received in response to analyzing the resource identification credentials. The resource identification credentials are validated with respect to a local ID cache structure and it is determined if the resource identification credentials are available for usage by the user. In response, a resource implementation process is executed.

14 Claims, 7 Drawing Sheets

(56) References Cited

U.S. PATENT DOCUMENTS

| | | | |
|---|---|---|---|
| 2009/0049243 A1* | 2/2009 | Dubrovsky | G06F 16/9574 |
| | | | 711/118 |
| 2011/0296504 A1* | 12/2011 | Burch | H04L 63/0815 |
| | | | 726/6 |
| 2014/0096213 A1* | 4/2014 | Quan | G06F 21/606 |
| | | | 726/7 |
| 2015/0026346 A1 | 1/2015 | Yoon | |
| 2016/0139949 A1 | 5/2016 | Jagannath | |
| 2017/0180335 A1* | 6/2017 | Quinlan | H04L 63/06 |
| 2017/0339065 A1* | 11/2017 | Li | H04L 41/0893 |
| 2018/0145923 A1 | 5/2018 | Chen | |
| 2018/0249280 A1 | 8/2018 | Han | |
| 2018/0309748 A1* | 10/2018 | Li | H04L 63/0815 |
| 2018/0367632 A1 | 12/2018 | Oh | |
| 2019/0075115 A1 | 3/2019 | Anderson | |
| 2019/0361817 A1* | 11/2019 | Black | G06F 12/0813 |
| 2019/0377899 A1* | 12/2019 | Stecher | H04L 9/0643 |
| 2020/0389499 A1* | 12/2020 | Koval | H04L 9/3247 |
| 2021/0326432 A1* | 10/2021 | Kaidi | H04L 9/0643 |

* cited by examiner

COMPUTER RESOURCE PROVISIONING

BACKGROUND

The present invention relates generally to a method for provisioning computer resources and in particular to a method and associated system for improving computer hardware and software technology associated with retrieving and validating resource credentials for computer resource assignment.

SUMMARY

A first aspect of the invention provides a computer resource provisioning method comprising: receiving, by a processor of a server hardware device from a user, a first request for identification credentials associated with a global identification broker system; generating, by the processor in response to the first request, resource identification credentials for the user; receiving, by the processor in response to analyzing the resource identification credentials, a second request for generating a first computer resource; validating, by the processor executing creation service code, the resource identification credentials with respect to a local ID cache structure; determining, by the processor based on results of the validating, if the resource identification credentials are available for usage by the user; and executing by the processor in response to results of the determining, a resource implementation process.

A second aspect of the invention provides a computer program product, comprising a computer readable hardware storage device storing a computer readable program code, the computer readable program code comprising an algorithm that when executed by a processor of a server hardware device implements a computer resource provisioning method, the method comprising: receiving, by the processor from a user, a first request for identification credentials associated with a global identification broker system; generating, by the processor in response to the first request, resource identification credentials for the user; receiving, by the processor in response to analyzing the resource identification credentials, a second request for generating a first computer resource; validating, by the processor executing creation service code, the resource identification credentials with respect to a local ID cache structure; determining, by the processor based on results of the validating, if the resource identification credentials are available for usage by the user; and executing by the processor in response to results of the determining, a resource implementation process.

A third aspect of the invention provides an A server hardware device comprising a processor coupled to a computer-readable memory unit, the memory unit comprising instructions that when executed by the processor implements a computer resource provisioning method comprising: receiving, by the processor from a user, a first request for identification credentials associated with a global identification broker system; generating, by the processor in response to the first request, resource identification credentials for the user; receiving, by the processor in response to analyzing the resource identification credentials, a second request for generating a first computer resource; validating, by the processor executing creation service code, the resource identification credentials with respect to a local ID cache structure; determining, by the processor based on results of the validating, if the resource identification credentials are available for usage by the user; and executing by the processor in response to results of the determining, a resource implementation process.

The present invention advantageously provides a simple method and associated system capable of provisioning computer resources.

DETAILED DESCRIPTION

Figure 1:
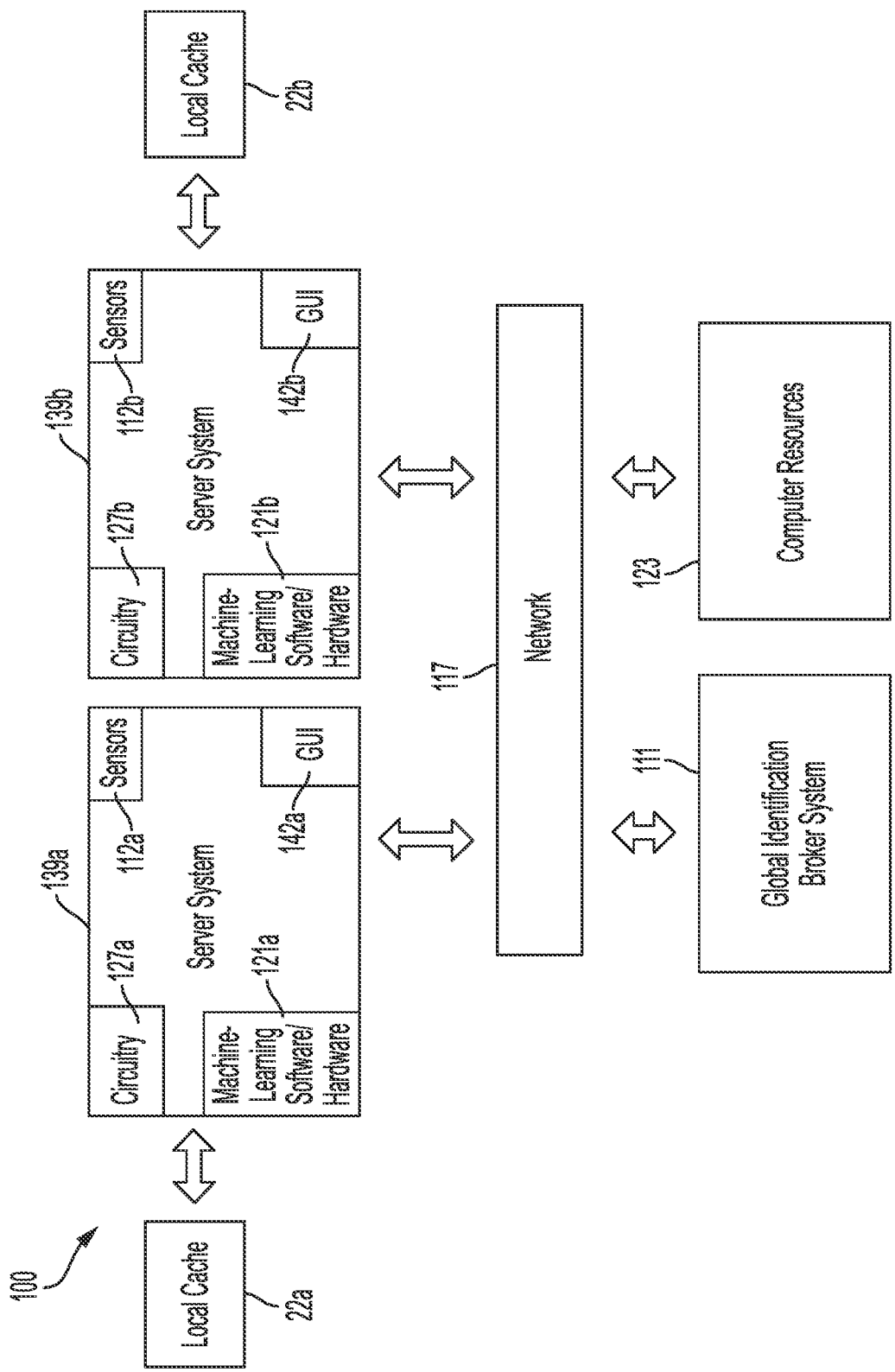
FIG. 1 illustrates a system for improving computer hardware and software technology associated with retrieving and validating resource credentials for computer resource assignment, in accordance with embodiments of the present invention.

FIG. 1 illustrates a system 100 for improving computer hardware and software technology associated with retrieving and validating resource credentials for computer resource assignment, in accordance with embodiments of the present invention. Resource generation requests initiated by users in a multi-regional cloud system may succeed or fail (to generate a resource(s)) without providing an associated status. For example, if a user initiates a request to generate a new resource, multiple resources may be generated erroneously. In this case, a most recent request may be determined to be successful thereby generating a first resource and a previous (duplicate) request may result in the generation of an orphaned resource that is not required for operation. Likewise, a data center may not have the capability to identify which resources are rendered obsolete based on network connectivity issues and thereby disabling the data center from re-collecting the obsolete resources. Therefore, system 100 is enabled to provide a new resource when receiving a user request thereby guaranteeing that the user will receive only one resource without resulting in generation of orphaned resources.

System 100 is configured to enable a process for re-collecting unused/inaccessible resource(s) from the user and provide a newly provisioned resource(s) when the user requests a new resource with a pre-existing ID thereby avoiding orphaned resources or a duplicated resource creation scenario. System 100 enables the following process for provisioning computer resources:

The process is initiated when a first resource is generated in response to a user request via a granted identifier (ID) tied to the user. In response, the granted ID is validated with a local ID cache (e.g., local cache 22a or 22b) to determine if the granted ID is free or is already in use. If the granted ID is located within in the local ID cache, the generation request may be denied. Subsequently, a user time out or network failure indication may be received as a function of a time out or system failure and the user or request creation service may not be notified that a resource generation is successful. Therefore, a second resource associated with the ID may be generated based on the user (or creation service) request and the original resource may be orphaned for re-collection. The second resource allocated to the ID comprises a duplicate of the original resource.

System 100 of FIG. 1 includes a server systems 139a and 139b (i.e., specialized hardware device), a global identification broker system 111, and computer resources 123 interconnected through a network 117. Server system 139a includes specialized circuitry 127a (that may include specialized software), sensors 112a, machine learning software code/hardware structure 121a (i.e., including machine learning software code), a graphical user interface (GUI) 142a, and a local cache structure 22a. Server system 139b includes specialized circuitry 127b (that may include specialized software), sensors 112b, machine learning software code/ hardware structure 121b (i.e., including machine learning software code), a GUI 142b, and a local cache structure 22b. Server systems 139a and 139b may be Bluetooth enabled to provide connectivity to each other and any type of system. Sensors 112a and 112b may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Global identification broker system 111 comprises a global storage system for storing resource identification credentials. Computer resources comprise any type of hardware and/or software resources required for user operation associated with server systems 139a and 139b. Server systems 139a and 139b, a global identification broker system 111, and computer resources 123 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server systems 139a and 139b, a global identification broker system 111, and computer resources 123 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving computer hardware and software technology associated with retrieving and validating resource credentials for computer resource assignment. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for re-collecting un-used or inaccessible computing resources from users and providing the users with newly provisioned resources associated with a new resource with respect to a pre-existing ID. Therefore, a user will only be provided with one new resource thereby avoiding orphaned resources or duplicated resource creation. The process may include:

1. Granting a resource ID for a user.
2. Enabling a request (from the user) to generate a first resource via usage of the granted resource ID.
3. Validating (by a creation service system) the granted resource ID with respect to a local ID cache structure to determine if the granted resource ID is free or is already in use. If the granted resource ID is located within the local ID cache structure, the request is denied.
4. Receiving a user time out or network failure indication with receiving a notification of resource generation success.
5. Receiving a request (from a user or request creation service) for allocating a second resource (i.e., a duplicate of the first resource) to the granted resource ID.
6. Creating (by the request creation service) the second resource associated with the granted resource ID.
7. Marking the first resource as orphaned for re-collection.

Figure 2:
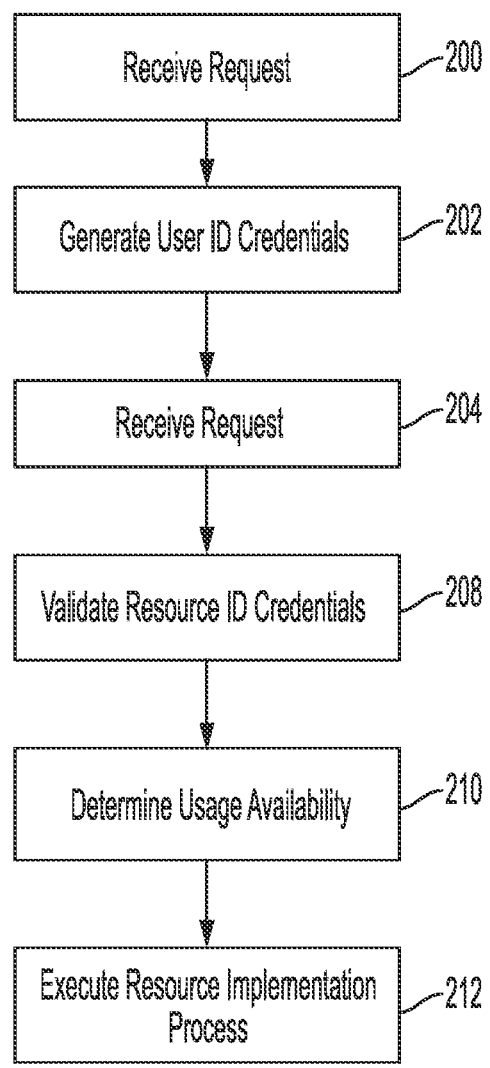
FIG. 2 illustrates an algorithm detailing a process flow enabled by the system of FIG. 1 for improving computer hardware and software technology associated with retrieving and validating resource credentials for computer resource assignment, in accordance with embodiments of the present invention.

FIG. 2 illustrates an algorithm detailing a process flow enabled by system 100 of FIG. 1 for improving computer hardware and software technology associated with retrieving and validating resource credentials for computer resource assignment, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server systems 139a and 139b, global identification broker system 111, and computer resources 123. In step 200, a first request for identification credentials associated with a global identification broker system is received (by a server hardware device) from a user. In step 202, resource identification credentials for the user are generated in response to the first request. In step 204, a second request for generating a first computer resource is received in response to analyzing the resource identification credentials. In step 208, resource identification credentials are validated with respect to a local ID cache structure via execution of creation service code. In step 210, it is determined (based on results of the validation of step 208) if the resource identification credentials are available for usage by the user. In step 212, a resource implementation process is executed based on the results of the determination of step 210. The resource implementation process is executed based on the following results variations from step 210.

If results of step 210 indicate that the identification credentials have been located within the local ID cache structure and are not available for usage by the user, executing the resource implementation process includes denying the second request of step 204.

If results of step 210 indicate that the identification credentials have not been located within the local ID cache structure and are thereby available for usage by said user, the resource implementation process may include:

1. Detecting (via sensors of the server hardware device) a time out failure associated with a response for generating the first computer resource.

2. Determining (based on results of the sensor detection) that the user or creation service code has not been notified that generating the first computer resource is successful.

3. Requesting (by the user or creation service code) that a second computer resource be allocated with respect to the identification credentials. The second computer resource comprises a duplicate of the first computer resource.

4. Generating the second computer resource associated with the identification credentials.

5. Flagging the first computer resource as orphaned for re-collection.

Alternatively, if results of step 210 indicate that the identification credentials have not been located within the local ID cache structure and are thereby available for usage by said user, the resource implementation process may include:

1. Detecting (via sensors of the server hardware device) a network failure indication associated with a response for generating the first computer resource.

2. Determining (based on results of the network failure detection) that the user or creation service code has not been notified that generating first computer resource is successful.

3. Receiving a request (from the user or creation service code) that a second computer resource be allocated with respect to the identification credentials. The second computer resource comprises a duplicate of the first computer resource.

4. Generating the second computer resource associated with the identification credentials.

5. Flagging the first computer resource as orphaned for re-collection.

Figure 3:
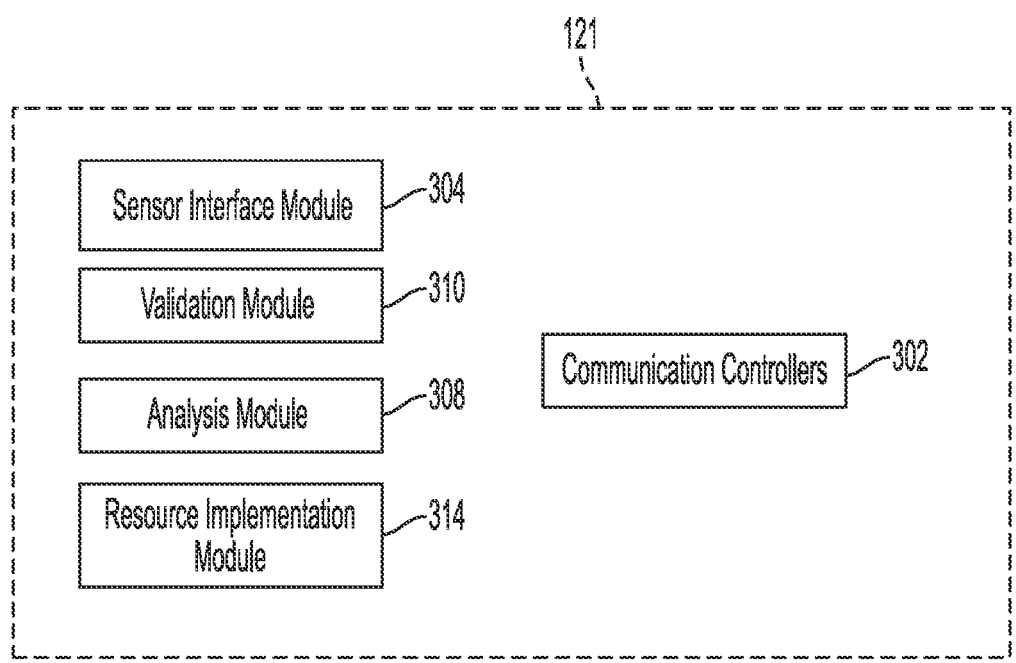
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121*a* and 121*b* (and/or circuitry 127*a* and 127*b*) of FIG. 1, in accordance with embodiments of the present invention. Machine learning software/hardware structure 121*a* and 121*b* each include a sensor interface module 304, a validation module 310, an analysis module 308, a resource implementation module 314, and communication controllers 302. Sensor interface module 304 comprises specialized hardware and software for controlling all functions related to sensors 112*a* and/or 112*a* of FIG. 1. Validation module 310 comprises specialized hardware and software for controlling all functionality related control of all validation functionality for implementing the process described with respect to the algorithm of FIG. 2. Analysis 308 comprises specialized hardware and software for controlling all functions related to the analysis steps of FIG. 2. Resource module 314 comprises specialized hardware and software for controlling all functions related to generating and allocating computer resources. Communication controllers 302 are enabled for controlling all communications between sensor interface module 304, validation module 310, analysis module 308, and resource implementation module 314.

Figure 4:
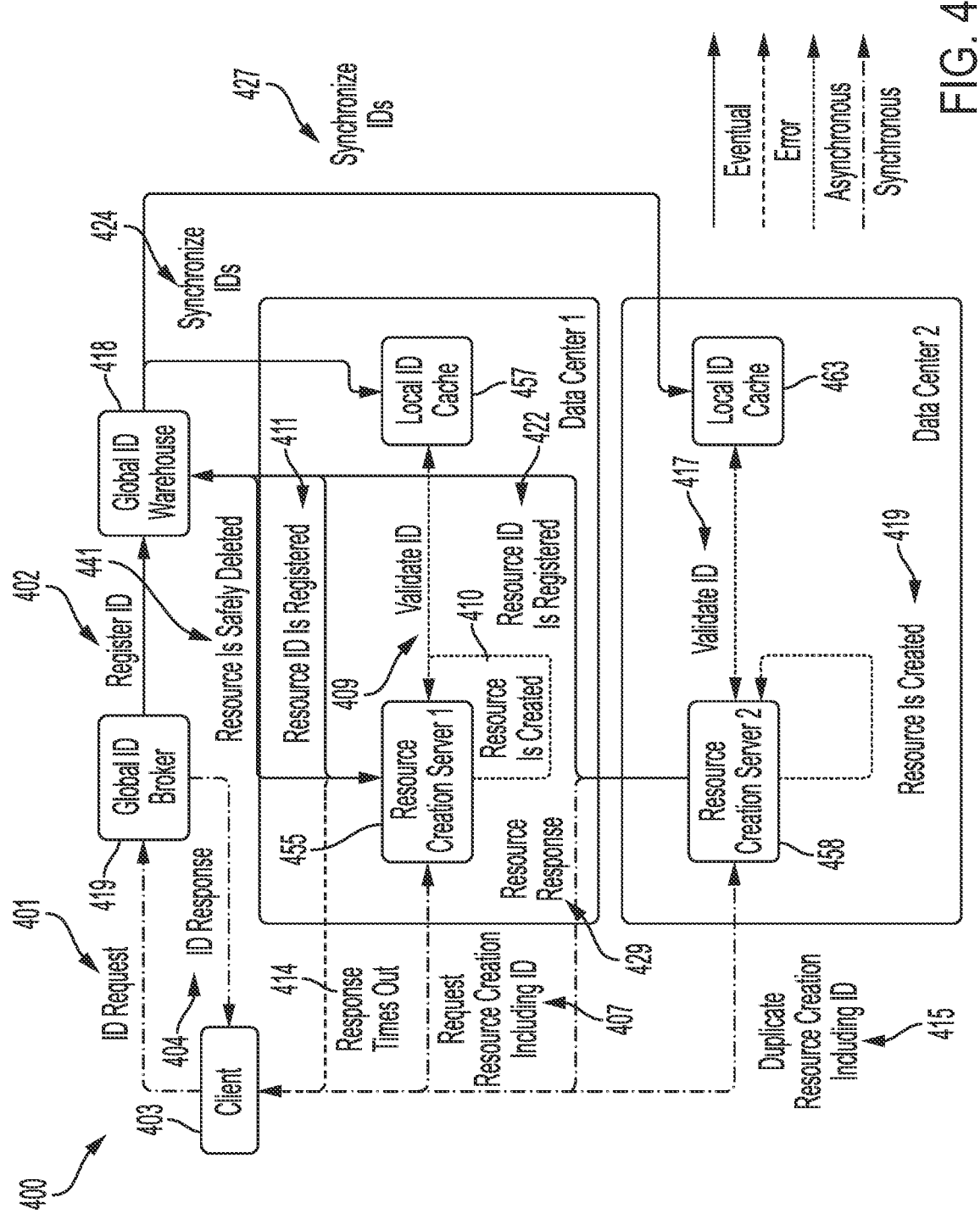
FIG. 4 illustrates an algorithm detailing a process flow enabled by the system of FIG. 1 for implementing a resource generation and allocation process, in accordance with embodiments of the present invention.

FIG. 4 illustrates an algorithm 400 detailing a process flow enabled by system 100 of FIG. 1 for implementing a resource generation and allocation process, in accordance with embodiments of the present invention. In step 401, a user (client) 403 enters a request for an ID from a global ID broker 419. In response, an ID is returned to the user. In step 402, the new user ID is registered (in step 411 or step 422) with a global ID warehouse 418. In step 404, a response associated with the ID is generated for the user in step 429. In step 407, the user transmits a request (with the ID) to a resource creation server 455 for creating a new resource within a data center (e.g., data center 1) in step 410. In step 409, a request creation service validates the ID with a local ID cache 457 to determine if the ID is available or is already in use. If the ID is located within local ID cache 457, the request is immediately denied. If the ID is not located within local ID cache 457, a request creation process is initiated. If the user request is detected to time out or to be associated with a network fail in step 414 and the request creation service has successfully created a new resource associated with the ID of the user, the request creation service may not automatically receive notification of the success due to system flaws. Therefore, the user and/or associated service will typically report the new resource creation as a failure and will resume operation from a same step and the user and/or service will attempt to retrieve a new resource allocated for the ID from resource creation server 458 in step 415. The user or service may transmit the request to data center 1 or data center 2. The request is received by request creation server 458, the ID is validated with a local ID cache 463 in step 417, the resource is created in step 419, and the ID is successfully returned to the user. All IDs are synchronized in steps 424 and 427. The resource associated with the ID in the first resource creation attempt is considered orphaned and is marked for re-collection or deletion in step 441. The algorithm 400 enables a data center to provide the capability to create a duplicate resource when requested by a user and/or service and may re-collect a previously created orphaned resource.

Figure 5:
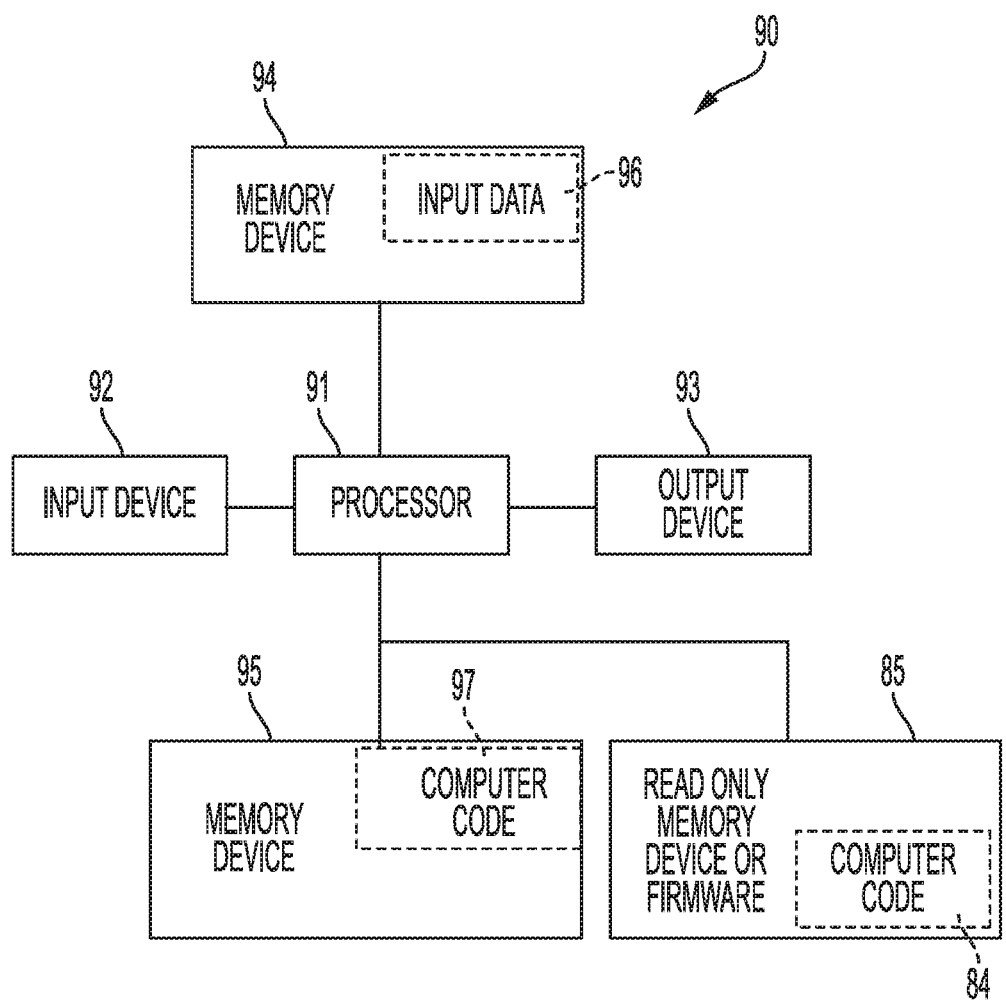
FIG. 5 illustrates a computer system used by the system of FIG. 1 improving computer hardware and software technology associated with retrieving and validating resource credentials for computer resource assignment, in accordance with embodiments of the present invention.

FIG. 5 illustrates a computer system 90 (e.g., server system 139*a* and 139*b* and/or computer resources 123 of FIG. 1) used by or comprised by the system of FIG. 1 for improving computer hardware and software technology associated with retrieving and validating resource credentials for computer resource assignment, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving computer hardware and software technology associated with retrieving and validating resource credentials for computer resource assignment. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve computer hardware and software technology associated with retrieving and validating resource credentials for computer resource assignment. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving computer hardware and software technology associated with retrieving and validating resource credentials for computer resource assignment. In another embodiment, the invention provides a business method that performs the process steps of the invention on a subscription, advertising, and/or fee basis. That is, a service supplier, such as a Solution Integrator, could offer to enable a process for improving computer hardware and software technology associated with retrieving and validating resource credentials for computer resource assignment. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
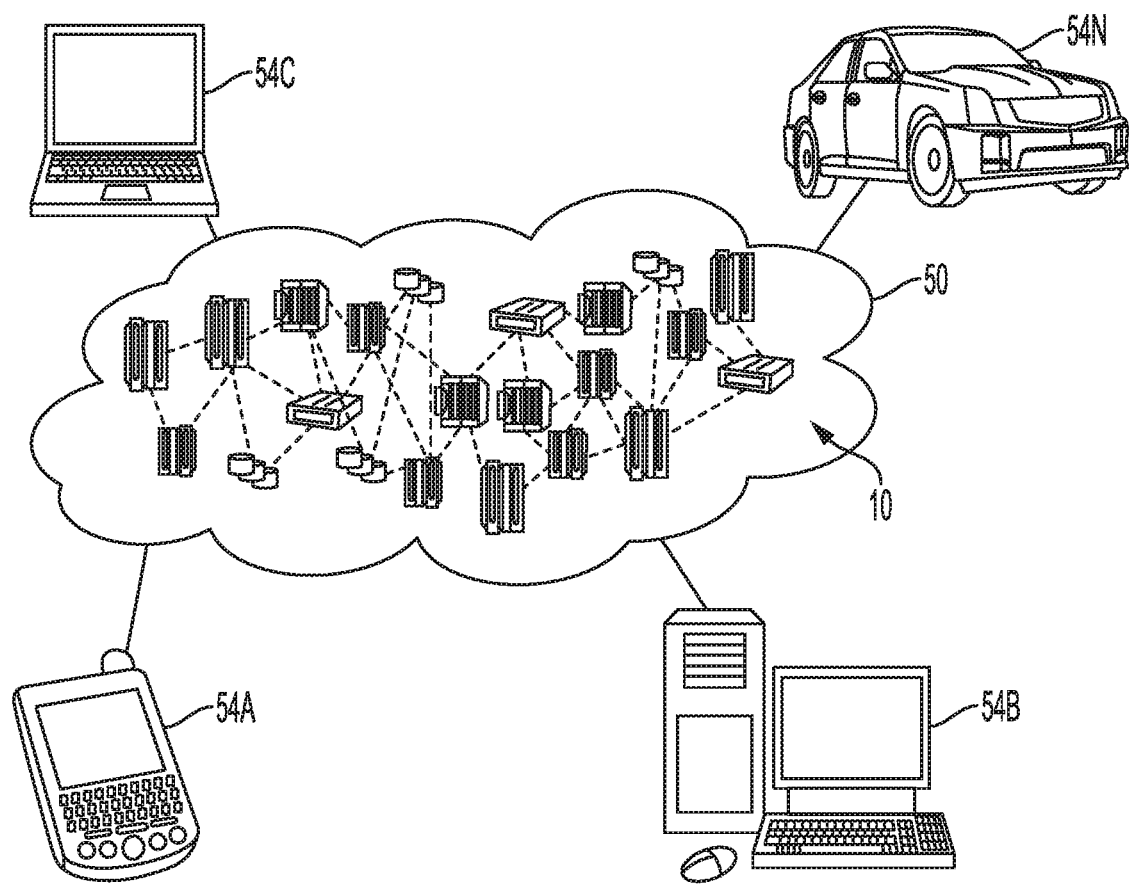
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
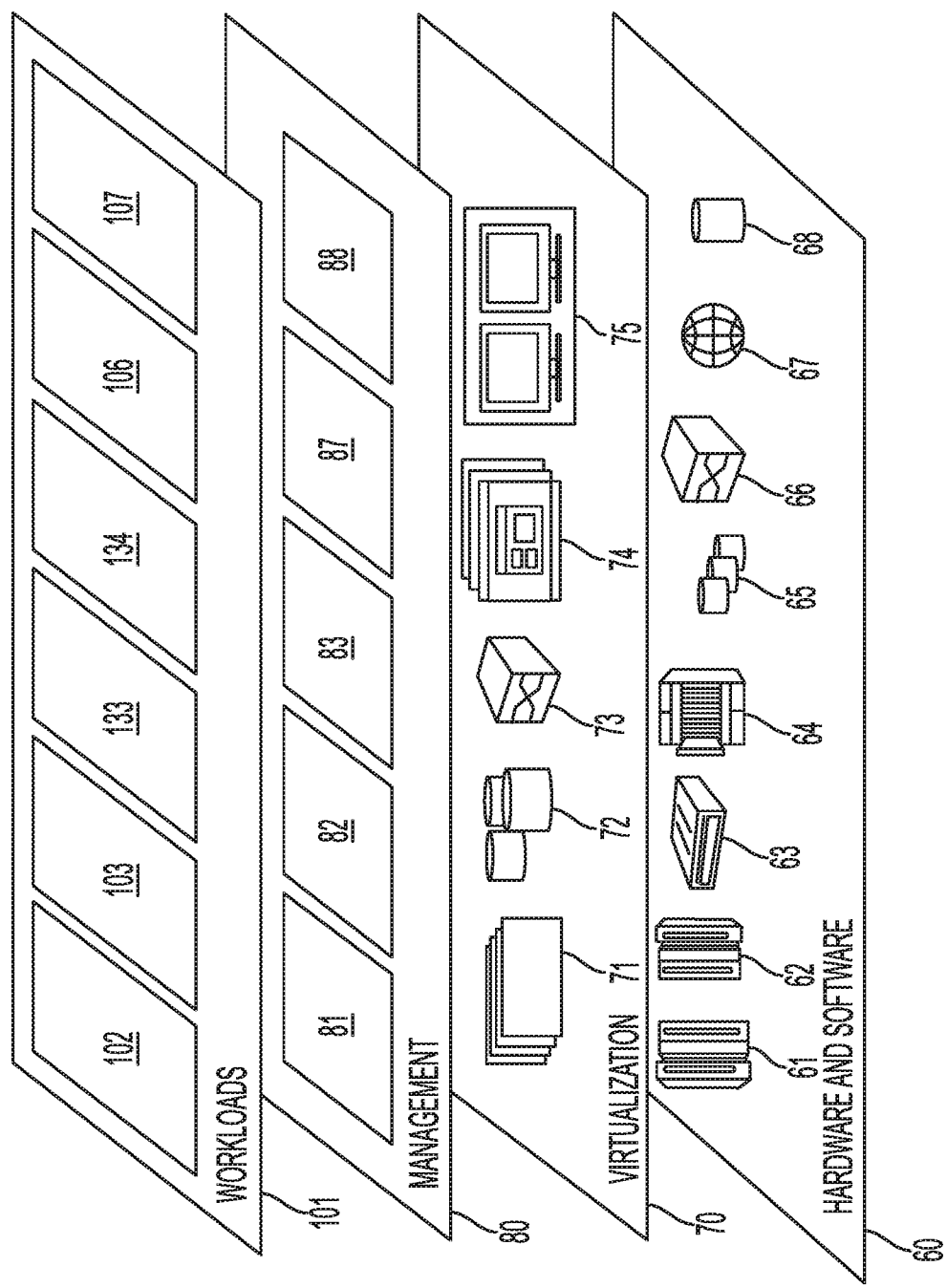
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving computer hardware and software technology associated with retrieving and validating resource credentials for computer resource assignment 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer resource provisioning method comprising:
receiving, by a processor of a server hardware device from a user, a first request for identification credentials associated with a global identification broker system;
generating, by said processor in response to said first request, resource identification credentials for said user;
receiving, by said processor in response to analyzing said resource identification credentials, a second request for generating a first computer resource;
validating, by said processor executing creation service code, said resource identification credentials with respect to a local ID cache structure;
determining, by said processor based on results of said validating, if said resource identification credentials are available for usage by said user; and
executing by said processor in response to results of said determining, a resource implementation process, wherein said results of said determining indicate that said identification credentials have not been located within said local ID cache structure and are thereby available for usage by said user, and wherein said executing said resource implementation process comprises:
detecting, via sensors of said server, a time out failure associated with a response for said generating said first computer resource; and
determining, based on results of said detecting, that said user or said creation service code has not been notified that said generating said first computer resource is successful.

2. The method of claim 1, further comprising:
requesting, by said user or said creation service code, that a second computer resource be allocated with respect to said identification credentials, wherein said second computer resource comprises a duplicate of said first computer resource;
generating, said second computer resource associated with said identification credentials; and flagging said first computer resource as orphaned for re-collection.

3. The method of claim 1, wherein said executing said resource implementation process further comprises:
detecting, via said sensors of said server, a network failure indication associated with a response for said generating said first computer resource; and
determining, based on results of said detecting, that said user or said creation service code has not been notified that said generating said first computer resource is successful.

4. The method of claim 3, further comprising:
requesting, by said user or said creation service code, that a second computer resource be allocated with respect to said identification credentials, wherein said second computer resource comprises a duplicate of said first computer resource;
generating, said second computer resource associated with said identification credentials; and
flagging said first computer resource as orphaned for re-collection.

5. The method of claim 1, further comprising:
providing at least one support service for at least one of creating, integrating, hosting, maintaining, and deploying computer-readable code in the server, said code being executed by the computer processor to implement: said receiving said first request, said generating, said receiving said second request, said validating, said determining, and said executing.

6. A computer program product, comprising a computer readable hardware storage device storing a computer readable program code, said computer readable program code comprising an algorithm that when executed by a processor of a server hardware device implements a computer resource provisioning method, said method comprising:
receiving, by said processor from a user, a first request for identification credentials associated with a global identification broker system;
generating, by said processor in response to said first request, resource identification credentials for said user;
receiving, by said processor in response to analyzing said resource identification credentials, a second request for generating a first computer resource;
validating, by said processor executing creation service code, said resource identification credentials with respect to a local ID cache structure;
determining, by said processor based on results of said validating, if said resource identification credentials are available for usage by said user; and
executing by said processor in response to results of said determining, a resource implementation process, wherein said results of said determining indicate that said identification credentials have not been located within said local ID cache structure and are thereby available for usage by said user, and wherein said executing said resource implementation process comprises:
detecting, via sensors of said server, a time out failure associated with a response for said generating said first computer resource; and
determining, based on results of said detecting, that said user or said creation service code has not been notified that said generating said first computer resource is successful.

7. The computer program product of claim 6, wherein said method further comprises:
requesting, by said user or said creation service code, that a second computer resource be allocated with respect to said identification credentials, wherein said second computer resource comprises a duplicate of said first computer resource;
generating, said second computer resource associated with said identification credentials; and
flagging said first computer resource as orphaned for re-collection.

8. The computer program product of claim 6, wherein said executing said resource implementation process further comprises:
detecting, via said sensors of said server, a network failure indication associated with a response for said generating said first computer resource; and
determining, based on results of said detecting, that said user or said creation service code has not been notified that said generating said first computer resource is successful.

9. The computer program product of claim 8, wherein said method further comprises:
requesting, by said user or said creation service code, that a second computer resource be allocated with respect to said identification credentials, wherein said second computer resource comprises a duplicate of said first computer resource;
generating, said second computer resource associated with said identification credentials; and
flagging said first computer resource as orphaned for re-collection.

10. A server hardware device comprising a processor coupled to a computer-readable memory unit, said memory unit comprising instructions that when executed by the processor implements a computer resource provisioning method comprising:
receiving, by said processor from a user, a first request for identification credentials associated with a global identification broker system;
generating, by said processor in response to said first request, resource identification credentials for said user;
receiving, by said processor in response to analyzing said resource identification credentials, a second request for generating a first computer resource;
validating, by said processor executing creation service code, said resource identification credentials with respect to a local ID cache structure;
determining, by said processor based on results of said validating, if said resource identification credentials are available for usage by said user; and
executing by said processor in response to results of said determining, a resource implementation process, wherein said results of said determining indicate that said identification credentials have not been located within said local ID cache structure and are thereby available for usage by said user, and wherein said executing said resource implementation process comprises:
detecting, via sensors of said server, a time out failure associated with a response for said generating said first computer resource; and
determining, based on results of said detecting, that said user or said creation service code has not been notified that said generating said first computer resource is successful.

11. The server hardware device of claim 10, wherein said method further comprises:

requesting, by said user or said creation service code, that a second computer resource be allocated with respect to said identification credentials, wherein said second computer resource comprises a duplicate of said first computer resource;
generating, said second computer resource associated with said identification credentials; and
flagging said first computer resource as orphaned for re-collection.

12. The server hardware device of claim 10, wherein said executing said resource implementation process further comprises:
   detecting, via said sensors of said server, a network failure indication associated with a response for said generating said first computer resource; and
   determining, based on results of said detecting, that said user or said creation service code has not been notified that said generating said first computer resource is successful.

13. The server hardware device of claim 12, wherein said method further comprises:
   requesting, by said user or said creation service code, that a second computer resource be allocated with respect to said identification credentials, wherein said second computer resource comprises a duplicate of said first computer resource;
   generating, said second computer resource associated with said identification credentials; and
   flagging said first computer resource as orphaned for re-collection.

14. The server hardware device of claim 10, wherein said server hardware device operates within a multi-regional cloud system.

* * * * *